US012423769B2

(12) United States Patent
Porubanova et al.

(10) Patent No.: US 12,423,769 B2
(45) Date of Patent: Sep. 23, 2025

(54) SELECTING A REPROJECTION DISTANCE BASED ON THE FOCAL LENGTH OF A CAMERA

(71) Applicant: Microsoft Technology Licensing, LLC, Redmond, WA (US)

(72) Inventors: Michaela Porubanova, Seattle, WA (US); Gregory Michael Link, Charlotte, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 81 days.

(21) Appl. No.: 18/210,572

(22) Filed: Jun. 15, 2023

(65) Prior Publication Data

US 2024/0420277 A1 Dec. 19, 2024

(51) Int. Cl.
| | |
|---|---|
| *G06T 3/04* | (2024.01) |
| *G06T 7/00* | (2017.01) |
| *H04N 23/62* | (2023.01) |
| *H04N 23/67* | (2023.01) |

(52) U.S. Cl.
CPC ............ *G06T 3/04* (2024.01); *G06T 7/0002* (2013.01); *H04N 23/62* (2023.01); *H04N 23/67* (2023.01)

(58) Field of Classification Search
None
See application file for complete search history.

(56) References Cited

U.S. PATENT DOCUMENTS

| | | | |
|---|---|---|---|
| 10,820,795 | B1 | 11/2020 | Weise |
| 12,154,247 | B1 | 11/2024 | Porubanova |
| 2008/0084472 | A1* | 4/2008 | Trudeau ............... H04W 40/248 348/51 |
| 2013/0208976 | A1 | 8/2013 | Cook |
| 2014/0145914 | A1 | 5/2014 | Latta |
| 2014/0333665 | A1 | 11/2014 | Latta et al. |
| 2016/0232715 | A1 | 8/2016 | Lee |
| 2016/0349510 | A1 | 12/2016 | Miller |
| 2016/0349837 | A1 | 12/2016 | Miller |
| 2017/0309071 | A1 | 10/2017 | Benko et al. |
| 2018/0053284 | A1 | 2/2018 | Rodriguez et al. |
| 2018/0167607 | A1 | 6/2018 | Okamoto |
| 2019/0238818 | A1 | 8/2019 | Held |
| 2019/0295323 | A1 | 9/2019 | Gutierrez |
| 2021/0160440 | A1 | 5/2021 | Bleyer et al. |
| 2021/0160441 | A1* | 5/2021 | Bleyer .................... G06T 7/593 |
| 2021/0377505 | A1 | 12/2021 | Liu |

(Continued)

OTHER PUBLICATIONS

Notice of Allowance mailed on Apr. 5, 2024, in U.S. Appl. No. 18/210,578, 9 pages.

(Continued)

*Primary Examiner* — Heather R Jones
(74) *Attorney, Agent, or Firm* — WORKMAN NYDEGGER

(57) ABSTRACT

Techniques for linking a distance used during a reprojection operation with a focal length of a sensing system are disclosed. As a result, modifications to the focal length result in corresponding modifications to the distance. A focal length of the sensing system is adjusted. An image generated by the sensing system is accessed. A particular distance is selected based on the adjusted focal length of the sensing system. The distance is used to reproject the image.

19 Claims, 9 Drawing Sheets

(56) References Cited

U.S. PATENT DOCUMENTS

| | | |
|---|---|---|
| 2023/0245603 A1 | 8/2023 | Bavor, Jr. |
| 2024/0312145 A1* | 9/2024 | Hol |
| 2024/0378820 A1* | 11/2024 | Xiong .................. H04N 13/128 |
| 2024/0420278 A1 | 12/2024 | Porubanova |
| 2024/0422301 A1 | 12/2024 | Porubanova |

OTHER PUBLICATIONS

Notice of Allowance mailed on May 9, 2024, in U.S. Appl. No. 18/210,576, 7 pages.
International Search Report and Written Opinion received for PCT Application No. PCT/US2024/033186, Sep. 12, 2024, 15 pages.
Non-Final Office Action mailed on Jan. 19, 2024, in U.S. Appl. No. 18/210,576, 10 pages.
International Search Report and Written Opinion received for PCT Application No. PCT/US2024/034227, Aug. 30, 2024, 14 pages.
Non-Final Office Action mailed on Dec. 19, 2024, in U.S. Appl. No. 18/651,406, 12 Pages.
Notice of Allowance mailed on Mar. 26, 2025, in U.S. Appl. No. 18/210,577, 08 pages.
U.S. Appl. No. 18/210,576, filed Jun. 15, 2023.
U.S. Appl. No. 18/210,577, filed Jun. 15, 2023.
U.S. Appl. No. 18/210,578, filed Jun. 15, 2023.
U.S. Appl. No. 18/651,406, filed Apr. 30, 2024.
U.S. Appl. No. 18/773,182, filed Jul. 15, 2024.
International Search Report and Written Opinion Received in PCT Application No. PCT/US2024/039900, mailed on Dec. 2, 2024, 19 pages.
Final Office Action mailed on Jun. 9, 2025, in U.S. Appl. No. 18/651,406, 19 pages.

* cited by examiner

SELECTING A REPROJECTION DISTANCE BASED ON THE FOCAL LENGTH OF A CAMERA

BACKGROUND

The phrase "extended reality" (ER) is an umbrella term that collectively describes various different types of immersive platforms. Such immersive platforms include virtual reality (VR) platforms, mixed reality (MR) platforms, and augmented reality (AR) platforms.

For reference, conventional VR systems create completely immersive experiences by restricting their users' views to only virtual environments. This is often achieved through the use of a head mounted device (HMD) that completely blocks any view of the real world. With this HMD, a user can be entirely or partially immersed within an immersive environment. Conventional AR systems create an augmented reality experience by visually presenting virtual objects that are placed in the real world. Conventional MR systems also create an augmented reality experience by visually presenting virtual objects that are placed in the real world. In the context of an MR system, those virtual objects are typically able to be interacted with by the user, and those virtual objects can interact with real world objects. AR and MR platforms can also be implemented using an HMD.

Unless stated otherwise, the descriptions herein apply equally to all types of ER systems, which include MR systems, VR systems, AR systems, and/or any other similar system capable of displaying virtual content. An ER system can be used to display various different types of information to a user. Some of that information is displayed in the form of a "hologram." As used herein, the term "hologram" generally refers to virtual image content that is displayed by an ER system. In some instances, the hologram can have the appearance of being a three-dimensional (3D) object while in other instances the hologram can have the appearance of being a two-dimensional (2D) object.

Often, holograms are displayed in a manner as if they are a part of the actual physical world. For instance, a hologram of a flower vase might be displayed on a real-world table. In this scenario, the hologram can be considered as being "locked" or "anchored" to the real world. Such a hologram can be referred to as a "world-locked" hologram or a "spatially-locked" hologram that is spatially anchored to the real world. Regardless of the user's movements, a world-locked hologram will be displayed as if it was anchored or associated with the real-world. Other holograms can be locked to a particular position in the user's field of view (FOV). In any event, ER systems are able to generate numerous different types of holograms.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method for selecting a reprojection distance based on a focal length of a sensing system, said method including: adjusting a focal length of a sensing system; accessing an image generated by the sensing system; selecting a distance at which the image is to be reprojected, wherein the distance is based on the focal length of the sensing system, such that adjustments to the focal length of the sensing system results in corresponding adjustments to the distance; and reprojecting the image, wherein reprojecting the image causes the image to transition from initially having a first perspective to subsequently having a second perspective that is based on the distance and that is also based on the focal length.

In some aspects, the techniques described herein relate to a method for linking a plane distance used during a planar reprojection operation with a focal length of a sensing system, such that modifications to the focal length result in corresponding modifications to the plane distance, said method including: linking planar distances for planar reprojection operations performed on images generated by a sensing system to a focal length of the sensing system such that modifications to the focal length of the sensing system results in corresponding modifications to the planar distances selected for the planar reprojection operations; adjusting a focal length of a sensing system; accessing an image generated by the sensing system; selecting, based on the adjusted focal length of the sensing system, a planar distance at which to planarly reproject the image; and planarly reprojecting the image to the planar distance.

In some aspects, the techniques described herein relate to a computer system that links a plane distance used during a planar reprojection operation with a focal length of a sensing system, such that modifications to the focal length result in corresponding modifications to the plane distance, said computer system including: a processor system; and a storage system that stores instructions that are executable by the processor system to cause the computer system to: link planar distances for planar reprojection operations performed on images generated by a sensing system to a focal length of the sensing system such that modifications to the focal length of the sensing system results in corresponding modifications to the planar distances selected for the planar reprojection operations; adjust a focal length of a sensing system; access an image generated by the sensing system; select, based on the adjusted focal length of the sensing system, a planar distance at which to planarly reproject the image; and planarly reproject the image to the planar distance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
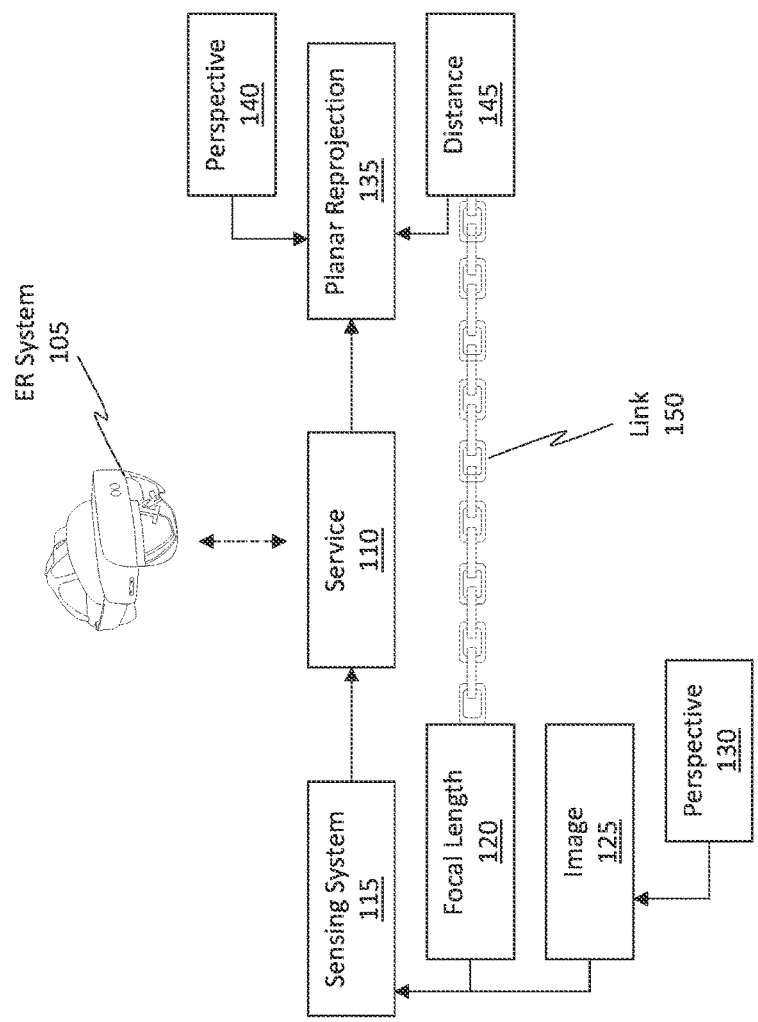
FIG. 1 illustrates an example architecture in which a planar reprojection distance is based on a focal length of a sensing system.

Many current ER devices provide both digital/holographic content as well as "passthrough" experiences so users can have an awareness of the real world. In a passthrough experience, an image of the real world environment is generated from an optical sensing system (e.g., a camera) mounted on the ER system. As used herein, the phrases "sensing system" and "camera" are used interchangeably.

That image may then have additional content (e.g., holograms) digitally overlaid on it. As an example, thermal content obtained from a thermal camera may be overlaid on a low light image generated by a low light camera, thereby forming an overlaid image, which is also referred to as a "passthrough image." The passthrough image is then reprojected (e.g., the process of changing a coordinate reference of the image from a first reference to a second reference) into the ER system's displays so that the user can see and interact with the world in ways their natural eyes might not allow (e.g., by observing the thermal content).

As some additional examples, low-light cameras might allow "night vision," whereas thermal cameras might allow "heat vision." Ultra-violet sensitive cameras might allow users to see where sunscreen has been applied. Content from these various images can be overlaid onto one another to form a passthrough image.

In some cases, those sensing systems (e.g., visible light cameras, low light cameras, thermal cameras, etc.) are directly positioned over the user's eyes on the ER system. Such positioning conveniently helps ensure that the images on the displays align well with the user's natural perception of the world. In general, however, this position is difficult to achieve for various reasons. For example, there may be variations between users' head sizes and shapes, resulting in the cameras being slightly offset relative to the users' eyes. As another example, the use of multiple sensors means that those sensors cannot all occupy the same position on the ER system and thus cannot all be directly in front of the user's eyes.

In such scenarios, directly passing the camera feed to the user can be disorienting and unhelpful due to various geometric errors that occur. These errors arise because the user's eye perspective is not the same as the camera's perspective. Such a scenario leads to mismatches in both vision cues for the user's ocular system and the user's proprioception system. These geometric/alignment errors persist for many other scenarios and are generally undesirable.

One potential mitigation to this problem is to "perspective correct" the camera image before presenting it to the user. With such a correction, for each sampled region of the camera image, that sampled region is placed in the destination display based on how it would be perceived if viewed from the user's eye location. Unfortunately, this geometry requires a piece of information that may not be available by the camera/sensing system; namely, the distance to the sampled region.

If an ER system is equipped with a depth determination unit, then this depth information can be directly sensed (e.g., using a time-of-flight depth measurement system). Alternatively, the depth information can be indirectly sensed (e.g., using a disparity comparison from more than one sensor). As another alternative, the depth information can be estimated or presumed, such as by presuming that all viewed content is some fixed distance away from the user. This third technique is facilitated by what is called a "planar reprojection" operation in which all the pixels of an image are reprojected to the same planar depth.

With systems that perform planar reprojections, the system designer or user selects an "appropriate" distance to presume at what depth the content exists. The farther from the truth this guessed distance is, the greater the geometric error in the resulting displayed image will be. Therefore, this distance is typically determined by the most likely distance or range of distances where the environment used for the passthrough experience is located. Determining that distance is a challenge, however.

While a majority of this disclosure is focused on implementations involving "planar" reprojections, it should be noted how the principles can be employed when other types of reprojections, or rather, other shaped reprojections, are performed as well. That is, other shapes of reprojections can be performed. Examples of such shapes include, but certainly are not limited to, spherical shape reprojections, horopter shaped reprojections, sloped plane reprojections, curved reprojections, and ellipsis reprojections. Indeed, other geometric patterns are possible as well. The distance to the sensed content may be unknown, but that distance can be estimated. In any event, these other shaped-reprojections also use a distance to help understand the geometry.

Relatedly, optical sensing systems generally feature what is called an "effective focal length." As used herein, the phrase "focal length" generally refers to the distance between a camera's lens and the sensor or film plate of the camera. The phrase "effective focal length" refers to the distance between the focal point of the lens of the sensing system and the principal point of interest, such as whatever object the sensing system is focusing on. Adjustments to the focal length result in changes to the effective focal length, such as changes to the magnification levels of the camera.

Objects near that effective focal length are sharp and in focus while objects sufficiently far from that effective focal length become increasingly blurry and out of focus. As a result, users often have control inputs to adjust the actual focal length of the sensing system, thereby allowing them to ensure that the sensing/camera system provides a sharp image quality at the primary distance of interest (i.e. the effective focal length).

The disclosed embodiments are directed to various advantages, benefits, and practical applications in the technical field of hologram generation and rendering. Generally, the embodiments are configured to adjust the so-called "planar reprojection plane distance" (aka "plane distance," "planar distance," or simply "distance") used for a planar reprojection operation based on the selected or adjusted focal length of the sensing system. That is, when the focal length is adjusted, a corresponding adjustment to the plane distance is also made, thereby linking the plane distance to the focal length. As mentioned before, this distance can be used for the other shaped reprojection operations as well.

This adjustment technique enables users to change the sensing system's focal length, thereby triggering a corresponding change to the reprojection plane distance. This corresponding adjustment operates to optimize the user's visual experience, such as by providing a sharp, focused, and undistorted region of interest with minimal geometric distortion. Advantageously, the disclosed embodiments automatically change the planar reprojection plane distance based on the user's selection of the sensing system's focal length. As another advantage, the disclosed embodiments automatically change the reprojection distance (regardless of the geometric shape of that reprojection operation) based on the user's selection of the sensing system's focal length.

Various benefits are realized by practicing the disclosed principles. As some examples, there is now no need for a separate user control to select the reprojection distance. Also, users will naturally be selecting focal lengths that are representative of the distances to the objects/regions of the scene they are most interested in. Doing so allows the ER system to automatically also reduce the geometric error in this relevant distance/region.

As another benefit, users can use perceived object sharpness as a means of tuning/finding the approximate distance(s) to objects that they might otherwise not know the estimated distance. Accordingly, these and numerous other benefits will now be described in more detail throughout the remaining portions of this disclosure.

Example Architectures

Attention will now be directed to FIG. 1, which illustrates an example computing architecture 100. Architecture 100 can, for example, be implemented by an ER system 105, which includes a head mounted device (HMD). As used herein, the phrases ER system and HMD can be used interchangeably and generally refer to a type of system that allows a user to see various portions of the real world and that also displays virtualized content in the form of holograms. Also, ER system 105 is able to provide passthrough images to the user.

It is typically the case that architecture 100 is implemented on an MR or AR system, though it can also be implemented in a VR system. Recall, the term "passthrough" generally refers to a system that renders an image configured to allow the user to see at least a portion of the real world.

Architecture 100 is shown as including a service 110, which can also be implemented on the ER system 105. As used herein, the term "service" refers to an automated program that is tasked with performing different actions based on input. In some cases, service 110 can be a deterministic service that operates fully given a set of inputs and without a randomization factor. In other cases, service 110 can be or can include a machine learning (ML) or artificial intelligence engine. The ML engine enables service 110 to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 110 is a cloud service operating in a cloud environment. In some implementations, service 110 is a local service operating on a local device, such as the ER system 105. In some implementations, service 110 is a hybrid service that includes a cloud component operating in the cloud and a local component operating on a local device. These two components can communicate with one another.

Service 110 is generally tasked with selecting a reprojection plane distance based on a focal length of a sensing system, such as sensing system 115. Sensing system 115 can be any type of sensing system, or rather, any type of camera. Some examples include, but are not limited to, any type of visible light camera, low light camera, thermal camera, ultraviolet light camera, and so on.

Sensing system 115 includes various optical sensors that allow sensing system 115 to zoom in or focus on an object of interest in a scene. As used herein, the term "scene" refers to the environment in which the ER system 105 is operating. A scene can include real-world objects as well as holograms.

To facilitate those focusing operations, sensing system 115 includes a focal length 120. Focal length 120 refers to a convergence measurement for the sensing system 115. In other words, focal length 120 is a measurement of how much the sensing system 115 either converges or diverges light into its sensor. Stated another way, focal length 120 refers to the distance between the sensing system 115's optical center of its lens and the sensor or film plate of the sensing system 115. The focal length 120 determines how much or what portions of the scene will be captured by the film plate. The focal length 120 also determines the level of magnification for the sensing system 115.

Sensing system 115 is able to generate an image 125. The sharpness or clarity of objects represented in image 125 often depend on the focal length 120. It should also be noted how image 125 provides a representation of a scene with a particular perspective 130. Perspective 130 refers to the viewing angle at which a scene is being viewed by the sensing system 115.

Service 110 is able to access the image 125 generated by sensing system 115 and then perform a planar reprojection 135 operation (or other geometric shape reprojection operation) on that image 125 and/or perform the planar reprojection on another image that is based on image 125 (e.g., the other image being an overlaid image that includes content generated from multiple different cameras and/or that includes holograms). For brevity purposes, this disclosure will focus on the scenario involving a planar reprojection operation. A person skilled in the art, however, will recognize how the disclosed operations can also be performed using other geometric shaped reprojection operations. Thus, as used herein, when a "planar" reprojection is mentioned, it should also be recognized how other geometric shaped reprojections can be performed as well.

Typically, when the planar reprojection 135 operation is performed, the ER system 105 does not have per-pixel depth information. Because of this lack of per-pixel depth information, service 110 is tasked with reprojecting the pixels in the image 125 in a planar manner. Thus, planar reprojection 135 refers to an operation in which service 110 reprojects all pixels in the image 125 to the same planar depth. In this regard, the planar reprojection 135 operation operates to modify the initial perspective 130 of the image 125 to a new perspective 140. Such a modification occurs by reprojecting all of the pixels in the image 125 to the same planar distance 145.

In accordance with the disclosed principles, service 110 also facilitates a new linkage (e.g., as shown by link 150) or connection operation between the selected planar distance 145 (i.e. the distance or depth at which an image is planarly reprojected) and the sensing system 115's focal length 120. That is, as provided by the disclosed principles, when the focal length 120 is modified, corresponding modifications are now also made to the distance 145. Further details on this aspect will be provided shortly.

Adjustments to Focal Length

Figure 2:
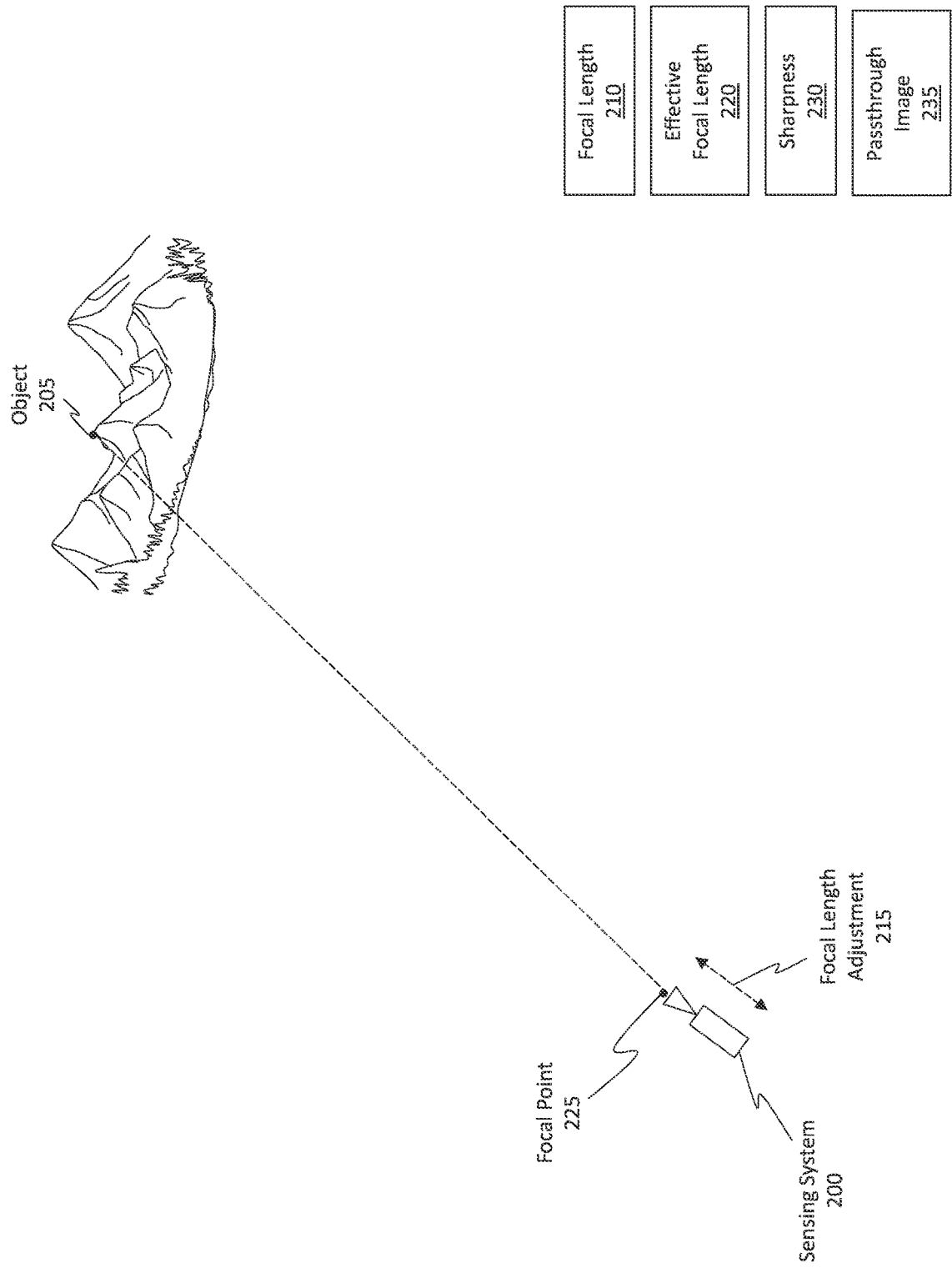
FIG. 2 illustrates an example scenario involving the focal length of a sensing system.

FIG. 2 shows a sensing system 200, which is representative of sensing system 115 of FIG. 1. Sensing system 200 is currently aimed at an object 205. Sensing system 200 includes a focal length 210 that can be adjusted, thereby increasing or decreasing the magnification of sensing system 200, as shown by focal length adjustment 215. Adjusting the focal length 210 operates to change the effective focal length 220 of sensing system 200. As mentioned previously, the phrase "effective focal length" refers to the distance between the focal point 225 of sensing system 200 and the principal point of interest, such as the object on which sensing system 200 is focusing (e.g., in FIG. 2, object 205 is the principal point of interest). The focal point 225 can be thought of as the convergence point of the lens of the sensing system 200.

Figure 3:
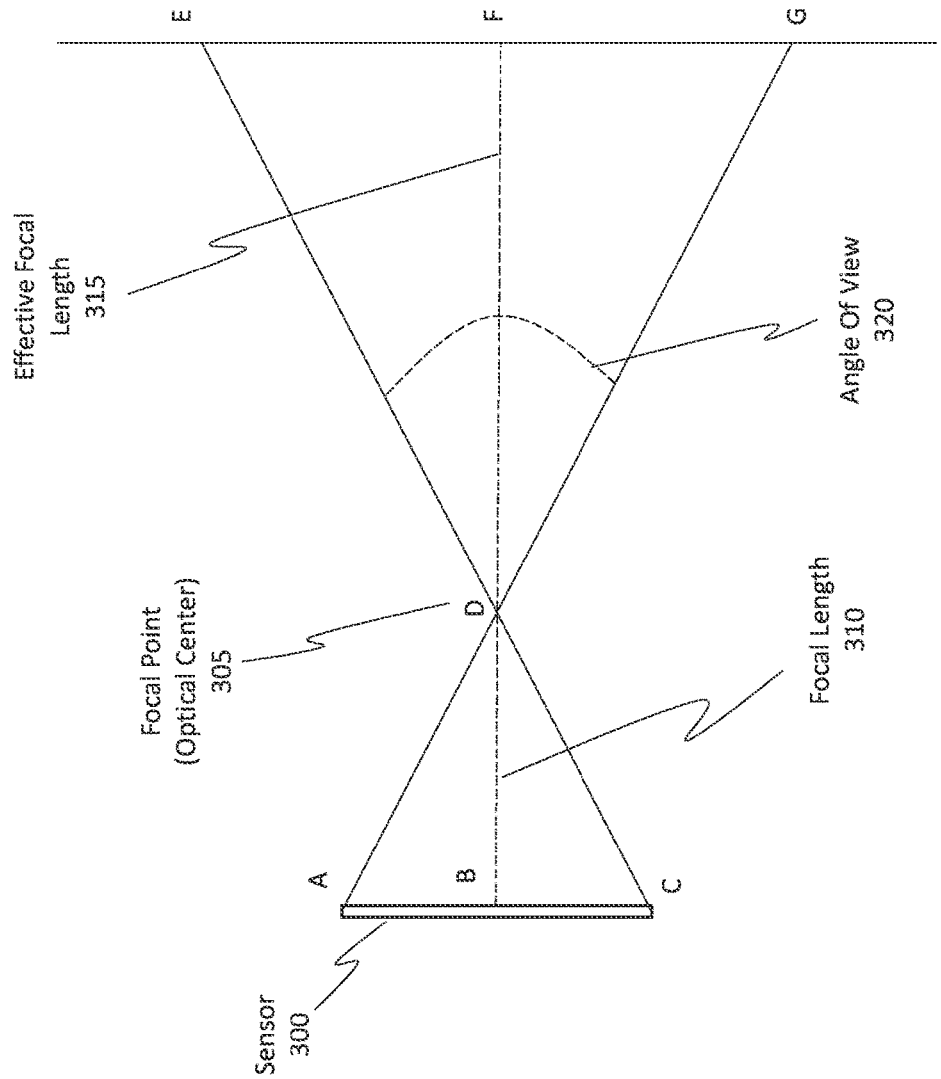
FIG. 3 illustrates further details on focal lengths.
Figure 4:
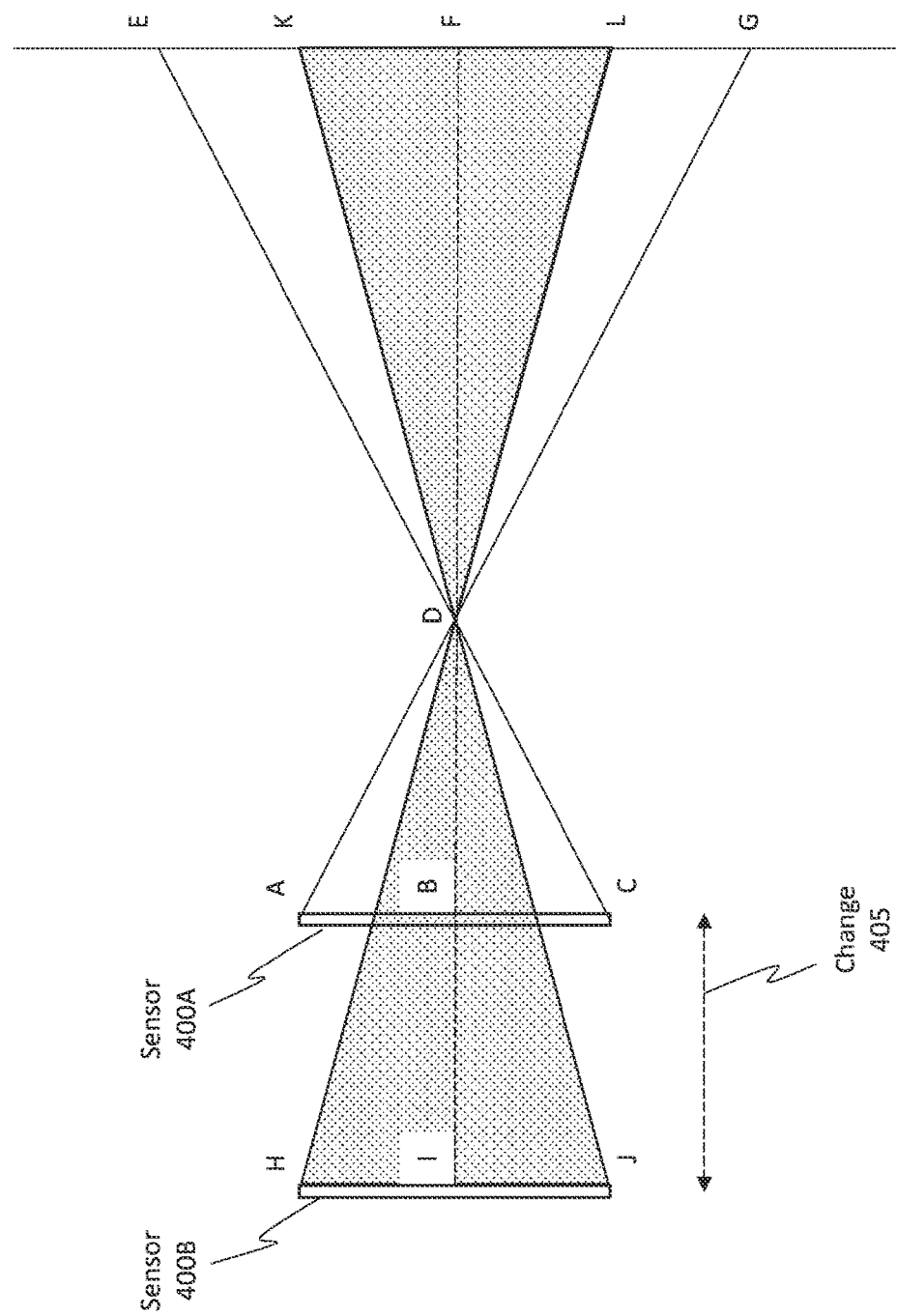
FIG. 4 illustrates further details on focal lengths.

By adjusting the focal length, the sharpness 230 of objects within the field of view (FOV) of sensing system 200 can be modified. Additionally, the resulting image generated by sensing system 200 can be used to generate a passthrough image 235, which is an image that includes all or portions of the real world as well as optionally holographic or other types of overlaid content. The passthrough image 235 can be displayed to a user wearing the ER system. FIGS. 3 and 4 provide further details on how adjustments to the focal length can be performed and can impact the visualization of the content that is represented in an image.

FIG. 3 shows a sensor 300, which is the film plate mentioned earlier. The size of sensor 300 is shown as spanning a space from point A to point C. Point "D" represents the focal point (optical center) 305 of the lens of the sensing system. The distance from point B to point D is the focal length 310 of the sensing system. Points A, B, C, and D are internal to the sensing system.

Points E, F, and G are external to the sensing system. The distance from points E to G is considered the FOV of the sensing system. Point F is the center of that FOV and is often where the principal point of interest is located. The distance between points D and F is considered the effective focal length 315 of the sensing system, and the angle between points E and G is considered the angle of view 320.

FIG. 4 shows the sensor 400A having a first focal length (e.g., between points B and D). This focal length can be modified, resulting in the sensor 400B now being at a new location and having a new focal length (e.g., between points I and D). Change 405 refers to the change in focal length. Notice, when the focal length is increased, the magnification is increased, resulting in a smaller FOV, but more sharpness for whatever object is located at point F. For instance, the FOV is initially from points E to G, but the FOV is changed to now be from points K and L. Accordingly, the focal length of a sensing system can be dynamically modified in real time.

Planar Reprojection

Figure 5:
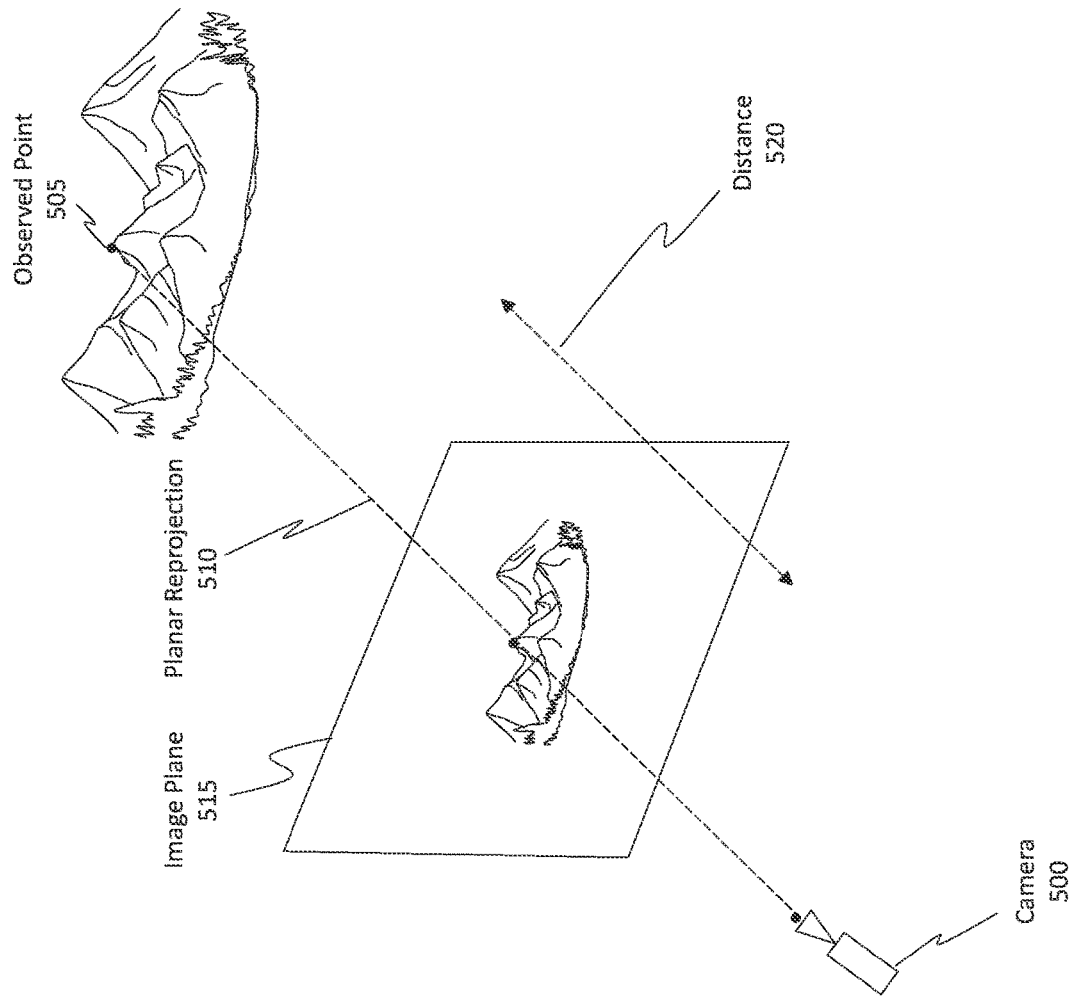
FIG. 5 illustrates a planar reprojection operation.

FIG. 5 illustrates an example of a planar reprojection operation. FIG. 5 shows a camera 500, which is one implementation of the sensing systems mentioned thus far.

Camera 500 is currently directed to an object in the scene, as labeled by observed point 505. Camera 500 generates an image of the scene, including the observed point 505.

The embodiments are able to perform a planar reprojection 510 operation on that image to reproject all of the pixels in that image to a new distance or depth relative to the camera 500. That is, all of the pixels in the image plane 515 are reprojected to the same depth. Any selected depth or distance 520 can be used as a part of the planar reprojection 510 operation. The image can be an original image or an overlaid image having content obtained from other sensors and/or content in the form of holograms.

Linking Planar Reprojection Depth to Focal Length

Figure 6:
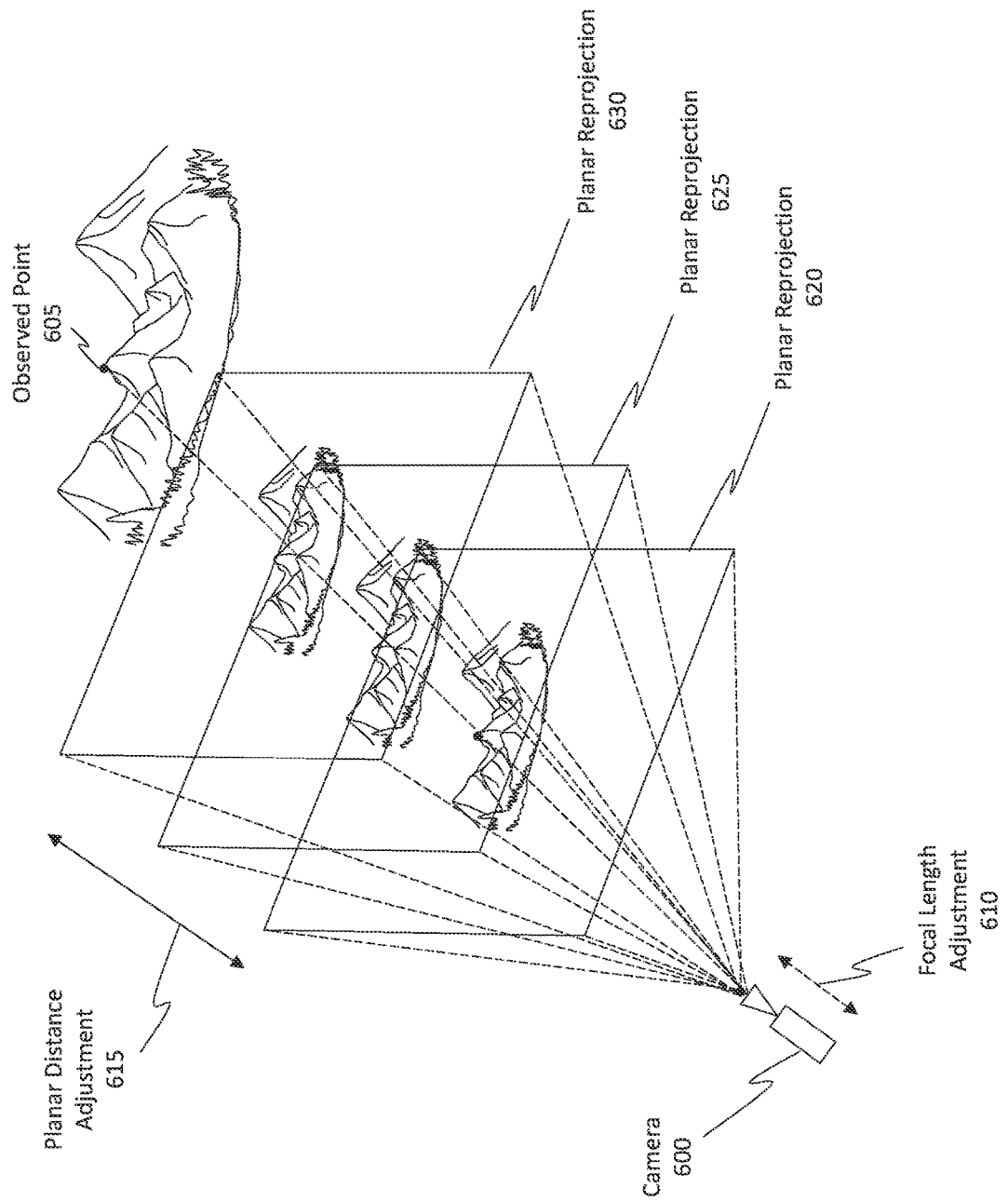
FIG. 6 illustrates how the distance or depth selected for a planar reprojection operation is now based on a focal length of the sensing system.

In accordance with the disclosed principles, the embodiments link a distance at which to planarly reproject an image to the focal length of the sensing system that generated the image. Consequently, modifications to the sensing system's focal length result in corresponding modifications, perhaps even proportionate changes, to the planar reprojection distance. FIG. 6 is illustrative.

FIG. 6 shows a camera 600, which is representative of the cameras and sensing systems mentioned herein. Camera 600 is currently aimed at or directed to a principal point of interest, which is labeled as observed point 605. The focal length of camera 600 can be modified dynamically and in real-time, as shown by focal length adjustment 610. Notably, the distance at which an image is planarly reprojected by the disclosed embodiments is dependent on the focal length of the camera 600. Therefore, adjustments to the focal length result in corresponding adjustments to the planar reprojection distance, as shown by planar distance adjustment 615.

As an example, consider a scenario where the sensing system is adjusted to have a first focal length. As a result, the embodiments select a first distance and planarly reproject the image to that first distance, as shown by planar reprojection 620. Next, the sensing system is adjusted to have a second focal length. As a result, the embodiments select a second distance and planarly reproject the image to that second distance, as shown by planar reprojection 625. To complete the example, the sensing system is adjusted to have a third focal length. As a result, the embodiments select a third distance and planarly reproject the image to that third distance, as shown by planar reprojection 630.

In some embodiments, the adjustments to the focal length result in proportionate adjustments to the planar reprojection distance. For instance, if the focal length is adjusted anywhere between 0 mm and 1 mm, the planar reprojection distance may be proportionately or linearly adjusted by some multiplier value.

In other embodiments, adjustments to the focal length may result in discrete, stepwise adjustments to the planar reprojection distance. For instance, if the focal length is adjusted anywhere between 0 mm and 1 mm, the planar reprojection distance may be adjusted the same discrete value, regardless of whether the focal length was adjusted 0.1 mm or 0.9 mm. A different stepwise increase may then be used if the focal length is adjusted anywhere between 1.01 mm and 2.0 mm. Of course, other values may be used, and these values are provided simply for example purposes. In any event, a modification or an adjustment to the sensing system's focal length results in a corresponding modification or adjustment to whatever distance or value is used to planarly reproject images generated by the sensing system.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
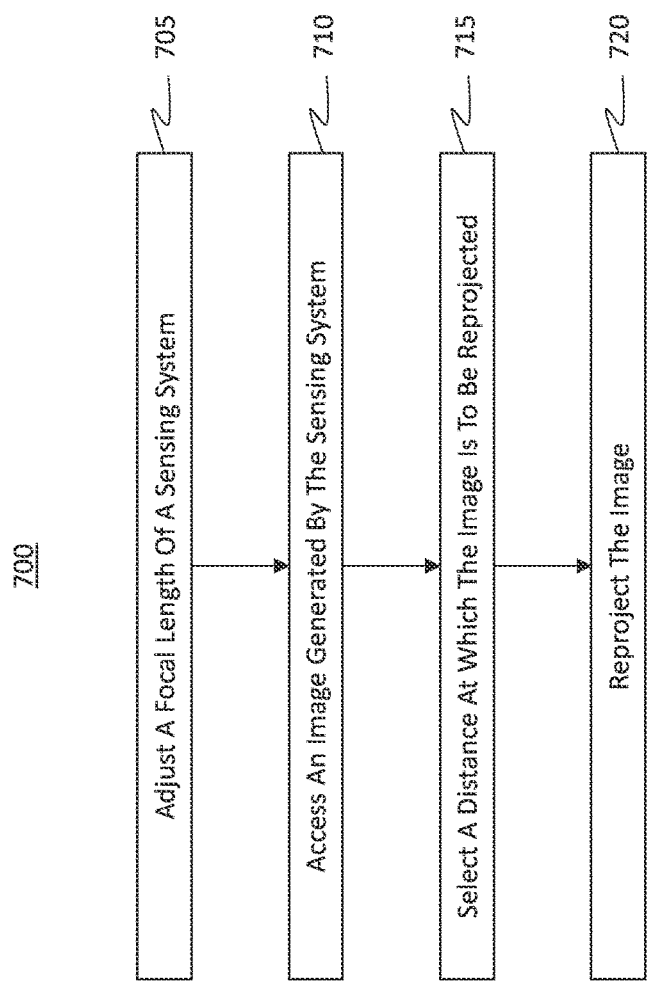
FIGS. 7 and 8 illustrate various different flowcharts of example methods for linking a planar reprojection distance to a focal length of a camera.

Attention will now be directed to FIG. 7, which illustrates a flowchart of an example method 700 for selecting a reprojection distance (e.g., perhaps a plane distance) based on a focal length of a sensing system. Method 700 may be implemented by service 110 of FIG. 1. Method 700 may also be performed by an extended reality (ER) device, particularly by one that provides passthrough images.

Method 700 includes an act (act 705) of adjusting a focal length of a sensing system. In some implementations, user input is received to adjust the focal length. For example, the ER system may have an input mechanism to allow the user to dynamically and in real-time adjust the focal length. This input mechanism can be, as various examples, a push button, dial knob, or any other input mechanism.

Act 710 includes accessing an image generated by the sensing system. The image may be included in a passthrough image. For instance, the passthrough image may be generated based on content included in the image.

The image also includes an object. Notably, a distance between the sensing system and the object is refrained from being obtained or accessed. For instance, in some scenarios, the ER system omits a depth sensing unit or, alternatively, the ER system includes a depth sensing unit, but that unit is not functioning.

In any event, the focal length may be adjusted via user input, and the focal length is adjusted to represent a distance to an object in a scene in which the sensing system is operating. Optionally, an object sharpness for the object represented in the image is determined, and the focal length is adjusted to account for the object sharpness (e.g., by increasing the sharpness to bring the object into focus).

Act 715 includes selecting a distance (e.g., a planar distance) at which the image is to be reprojected (e.g., a planar reprojection, a spherical reprojection, a horopter reprojection, a sloped plane reprojection, a curved reprojection, or an ellipsis reprojection). The distance is based on the focal length of the sensing system, such that adjustments to the focal length of the sensing system result in corresponding adjustments to the distance. In some implementations, adjustments to the focal length results in proportionate adjustments to the distance. Also, in some implementations, the process of selecting the distance may be performed automatically in response to a detected adjustment of the focal length.

In some implementations, the selected distance is a first distance included in a pair of selected distances. Consequently, the pair of selected distances includes the first distance and a second distance. The first distance, in some cases, is shorter than the second distance.

As an example, the first distance may be selected for reprojections that are near the user while the second distance may be selected for reprojections that are far from the user. As a more particular example, consider a scenario where a user is wearing the ER system, and the user is running. While the user is running, the user may desire to alternate the depth for the passthrough image, such as by having a first depth that is approximately the distance of the user's feet relative to the user's head and by having a second depth that is much farther away. Thus, when the user looks down to discern where he/she is running, the shorter projection depth may be used. When the user looks up to see at a distance where he/she is running, the longer projection depth may be used.

Act 720 includes reprojecting the image. For instance, the reprojection operation includes one or more of a planar reprojection, a spherical reprojection, a horopter reprojection, a sloped plane reprojection, a curved reprojection, or an ellipsis reprojection. The process of reprojecting the image causes the image to transition from initially having a first perspective to subsequently having a second perspective that is based on the distance and that is also based on the focal length.

Figure 8:
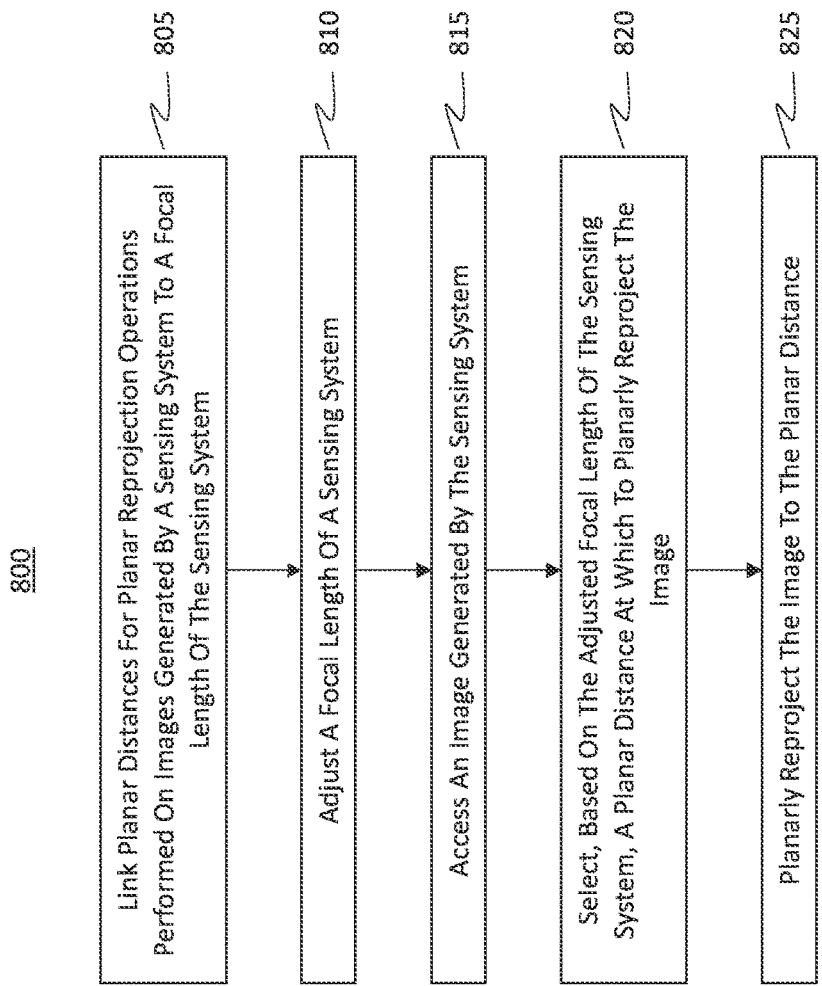

FIG. 8 illustrates a flowchart of an example method 800 for linking a plane distance used during a planar reprojection operation with a focal length of a sensing system, such that modifications to the focal length result in corresponding modifications to the plane distance. Method 800 may also be implemented by the service 110 of FIG. 1.

Method 800 includes an act (act 805) of linking planar distances for planar reprojection operations performed on images generated by a sensing system to a focal length of the sensing system. Consequently, modifications to the focal length of the sensing system result in corresponding modifications to the planar distances selected for the planar reprojection operations.

Act 810 includes adjusting a focal length of a sensing system. The process of adjusting the focal length may be performed via user input. In some scenarios, the process of adjusting the focal length is performed based on an effective focal length of the sensing system with respect to an object located in a scene in which the computer system, or rather, the ER system, is operating. Stated differently, the focal length may be selected via user input, and the focal length may be selected to represent a distance to an object in a scene in which the sensing system is operating.

Act 815 includes accessing an image generated by the sensing system. The image may be any type of image, including visible light images, low light images, thermal images, and so on.

Act 820 includes selecting, based on the adjusted focal length of the sensing system, a planar distance at which to planarly reproject the image. The process of selecting the planar distance, which is based on the focal length, may be performed automatically.

Act 825 includes planarly reprojecting the image to the planar distance. The process of planarly reprojecting the image to the planar distance is triggered in response to the focal length being adjusted.

In some implementations, method 800 further includes an act of adjusting, for a second time, the focal length of the sensing system. The method may then include an act of accessing a second image generated by the sensing system and also an act of selecting a second planar distance at which to planarly reproject the second image. The method then includes an act of planarly reprojecting the second image to the second planar distance. Optionally, the process of planarly reprojecting the second image to the second planar distance is triggered in response to the focal length being adjusted for the second time.

Example Computer/Computer Systems

Figure 9:
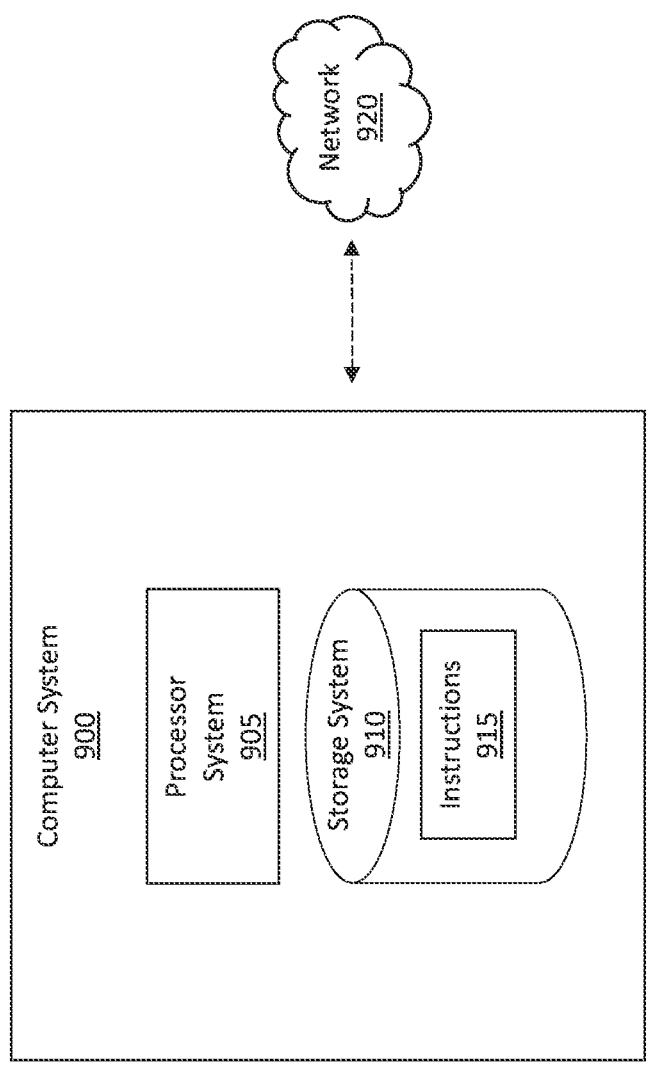
FIG. 9 illustrates an example computer system capable of performing any of the disclosed operations.

Attention will now be directed to FIG. 9 which illustrates an example computer system 900 that may include and/or be used to perform any of the operations described herein. Computer system 900 may take various different forms, such as the ER system 105 of FIG. 1. For example, computer system 900 may be embodied as a tablet, a desktop, a laptop, a mobile device, or a standalone device, such as those described throughout this disclosure. Computer system 900 may also be a distributed system that includes one or more connected computing components/devices that are in communication with computer system 900.

In its most basic configuration, computer system 900 includes various different components. FIG. 9 shows that computer system 900 includes a processor system 905 that includes one or more processor(s) (aka a "hardware processing unit") and a storage system 910.

Regarding the processor(s) of the processor system 905, it will be appreciated that the functionality described herein can be performed, at least in part, by one or more hardware logic components. For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 900. The different components, modules, engines, and services described herein may be implemented as objects or processors that execute on computer system 900 (e.g. as separate threads).

Storage system 910 may be physical system memory, which may be volatile, non-volatile, or some combination of the two. The term "memory" may also be used herein to refer to non-volatile mass storage such as physical storage media. If computer system 900 is distributed, the processing, memory, and/or storage capability may be distributed as well.

Storage system 910 is shown as including executable instructions 915. The executable instructions 915 represent instructions that are executable by the processor(s) of the processor system 905 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 900 may also be connected (via a wired or wireless connection) to external sensors (e.g., one or more remote cameras) or devices via a network 920. For example, computer system 900 can communicate with any number devices or cloud services to obtain or process data. In some cases, network 920 may itself be a cloud network. Furthermore, computer system 900 may also be connected through one or more wired or wireless networks to remote/separate computer systems(s) that are configured to perform any of the processing described with regard to computer system 900.

A "network," like network 920, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 900 will include one or more communication channels that are used to communicate with the network 920. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for selecting a reprojection distance based on a focal length of a sensing system, said method comprising:
   adjusting a focal length of a sensing system, wherein the focal length is a distance between a lens of the sensing system and a sensor of the sensing system;
   accessing an image generated by the sensing system, wherein the image reflects a scene in which the sensing system is operating, and wherein the image includes pixels representative of an object in the scene;
   selecting a distance at which the image is to be reprojected, wherein the distance is based on the focal length of the sensing system, such that adjustments to the focal length of the sensing system result in corresponding adjustments to the distance and such that the distance is not based on a second distance that existed between the lens of the sensing system and the object at a time when the image was generated; and
   reprojecting the image, wherein reprojecting the image causes the image to transition from initially having a first perspective to subsequently having a second perspective that is based on the distance and that is also based on the focal length.

2. The method of claim 1, wherein said reprojecting includes one or more of a planar reprojection, a spherical reprojection, a horopter reprojection, a sloped plane reprojection, a curved reprojection, or an ellipsis reprojection.

3. The method of claim 1, wherein selection of the distance is performed automatically in response to a detected adjustment of the focal length.

4. The method of claim 1, wherein the method is performed by an extended reality (ER) device.

5. The method of claim 1, wherein the image is a passthrough image.

6. The method of claim 1, wherein the second distance between the lens of the sensing system and the object is refrained from being obtained.

7. The method of claim 1, wherein the selected distance is a first distance included in a pair of selected distances, such that the pair of selected distances includes the first distance and a third distance, and wherein the first distance is shorter than the third distance.

8. The method of claim 1, wherein user input is received to adjust the focal length.

9. The method of claim 1, wherein the focal length is adjusted via user input, and wherein the focal length is adjusted to represent the second distance to the object in the scene.

10. The method of claim 1, wherein an object sharpness for the object represented in the image is determined, and wherein the focal length is adjusted to account for the object sharpness.

11. A method for linking a plane distance used during a planar reprojection operation with a focal length of a sensing system, such that modifications to the focal length result in corresponding modifications to the plane distance, said method comprising:
    linking planar distances for planar reprojection operations performed on images generated by a sensing system to a focal length of the sensing system such that modifications to the focal length of the sensing system result in corresponding modifications to the planar distances selected for the planar reprojection operations, wherein the focal length is a distance between a lens of the sensing system and a sensor of the sensing system;
    adjusting the focal length of the sensing system;
    accessing an image generated by the sensing system, wherein the image reflects a scene in which the sensing system is operating, and wherein the image includes pixels representative of an object in the scene;
    selecting, based on the adjusted focal length of the sensing system, a planar distance at which to planarly reproject the image such that the planar distance is not based on a distance that existed between the lens of the sensing system and the object at a time when the image was generated; and
    planarly reprojecting the image to the planar distance.

12. The method of claim 11, wherein the method further includes:
    adjusting, for a second time, the focal length of the sensing system;
    accessing a second image generated by the sensing system;
    selecting a second planar distance at which to planarly reproject the second image; and
    planarly reprojecting the second image to the second planar distance.

13. The method of claim 12, wherein planarly reprojecting the second image to the second planar distance is triggered in response to the focal length being adjusted for the second time.

14. The method of claim 11, wherein planarly reprojecting the image to the planar distance is triggered in response to the focal length being adjusted.

15. The method of claim 11, wherein adjusting the focal length is performed via user input, and wherein selecting the planar distance, which is based on the focal length, is performed automatically.

16. A computer system that links a plane distance used during a planar reprojection operation with a focal length of a sensing system, such that modifications to the focal length result in corresponding modifications to the plane distance, said computer system comprising:
- a processor system; and
- a storage system that stores instructions that are executable by the processor system to cause the computer system to:
  - link planar distances for planar reprojection operations performed on images generated by a sensing system to a focal length of the sensing system such that modifications to the focal length of the sensing system result in corresponding modifications to the planar distances selected for the planar reprojection operations, wherein the focal length is a distance between a lens of the sensing system and a sensor of the sensing system;
  - adjust the focal length of the sensing system;
  - access an image generated by the sensing system;
  - select, based on the adjusted focal length of the sensing system, a planar distance at which to planarly reproject the image such that the planar distance is not based on a distance that existed between the lens of the sensing system and the object at a time when the image was generated; and
  - planarly reproject the image to the planar distance.

17. The computer system of claim 16, wherein the image is a passthrough image.

18. The computer system of claim 16, wherein the computer system is an extended reality (ER) system.

19. The computer system of claim 16, wherein the focal length is selected via user input, and wherein the focal length is selected to represent the distance to the object in the scene in which the sensing system is operating.

\* \* \* \* \*